US012769029B2

(12) United States Patent
Holmes et al.

(10) Patent No.: US 12,769,029 B2
(45) Date of Patent: Oct. 20, 2026

(54) SUBSURFACE CHARACTERIZATION BASED ON MULTIPLE CORRELATION SCENARIOS

(71) Applicant: Chevron U.S.A. Inc., San Ramon, CA (US)

(72) Inventors: Robert Chadwick Holmes, Houston, TX (US); Morgan David Sullivan, Houston, TX (US); Ashley D. Harris, Houston, TX (US); Fabien J. Laugier, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 588 days.

(21) Appl. No.: 18/035,171

(22) PCT Filed: Nov. 10, 2021

(86) PCT No.: PCT/US2021/058823

§ 371 (c)(1),
(2) Date: May 3, 2023

(87) PCT Pub. No.: WO2022/103866

PCT Pub. Date: May 19, 2022

(65) Prior Publication Data

US 2024/0061146 A1 Feb. 22, 2024

Related U.S. Application Data

(60) Provisional application No. 63/113,720, filed on Nov. 13, 2020.

(51) Int. Cl.
*G01V 99/00* (2024.01)

(52) U.S. Cl.
CPC .................................... *G01V 99/00* (2013.01)

(58) Field of Classification Search
None
See application file for complete search history.

(56) References Cited

U.S. PATENT DOCUMENTS 7,126,340 B1 10/2006 Ameen
7,769,545 B2 * 8/2010 Lomask ................ G01V 1/301 702/14

(Continued)

FOREIGN PATENT DOCUMENTS

CN 105389467 3/2016
CN 114880825 8/2022

(Continued)

OTHER PUBLICATIONS

AU Examination Report from AU Application No. 2021377807 mailed Sep. 1, 2023 (3 pages).

(Continued)

*Primary Examiner* — Lina Cordero
(74) *Attorney, Agent, or Firm* — Sheppard, Mullin, Richter & Hampton LLP

(57) ABSTRACT

A group of wells may be located within a region of interest. Multiple scenarios of boundary locations within a group of wells may be obtained. A top-and-base boundary pair, defining a package of interest, may be identified within the individual scenarios of boundary locations. A subsurface property of the package of interest within the individual scenarios of boundary locations may be determined, and the subsurface property of the package of interest within the individual scenarios of boundary locations may be used to determine a subsurface characteristic of the region of interest.

20 Claims, 5 Drawing Sheets

(56) References Cited

U.S. PATENT DOCUMENTS

| | | | | |
|---|---|---|---|---|
| 9,279,323 | B2 | 3/2016 | Mullins | |
| 10,459,098 | B2 | 10/2019 | Grant | |
| 2007/0027666 | A1 | 2/2007 | Frankel | |
| 2007/0168133 | A1 | 7/2007 | Bennett | |
| 2009/0299703 | A1* | 12/2009 | Liu | G01V 11/00 703/2 |
| 2012/0253770 | A1 | 10/2012 | Stern | |
| 2013/0261978 | A1 | 10/2013 | Xu | |
| 2014/0222403 | A1* | 8/2014 | Lepage | G01V 20/00 703/6 |
| 2014/0236549 | A1 | 8/2014 | Le Ravalec | |
| 2015/0035536 | A1 | 2/2015 | Tang | |
| 2016/0124116 | A1* | 5/2016 | Souche | G01V 20/00 703/2 |
| 2017/0067337 | A1* | 3/2017 | Havens | G01V 1/288 |
| 2018/0225778 | A1 | 8/2018 | Grant | |
| 2020/0356856 | A1 | 11/2020 | Moniruzzaman | |
| 2021/0048556 | A1 | 2/2021 | Sun | |
| 2021/0208302 | A1 | 7/2021 | Ma | |
| 2021/0405238 | A1* | 12/2021 | Peng | G01V 1/301 |
| 2022/0120930 | A1 | 4/2022 | Kiselev | |
| 2023/0351079 | A1 | 11/2023 | Holmes | |
| 2023/0366309 | A1 | 11/2023 | Holmes | |
| 2023/0399934 | A1 | 12/2023 | Holmes | |

FOREIGN PATENT DOCUMENTS

| | | |
|---|---|---|
| WO | 2017135972 | 8/2017 |
| WO | 2018164680 | 9/2018 |
| WO | 2020185918 | 9/2020 |

OTHER PUBLICATIONS

AU Examination Report from AU Application No. 2021379607, mailed Aug. 31, 2023 (3 pages).

AU Examination Report from AU Application No. 2021380731 mailed Sep. 4, 2023 (4 pages).

Zhou et al. A Stratigraphic Prediction Method Based on Machine Learning. Applied Sciences [online], pp. 1-29, Aug. 29, 2019 [retrieved on Jan. 10, 2022]. Retrieved from the Internet: <URL:https://www.mdpi.com/2076-3417/9/17/3553/pdf>, especially pp. 1-29. entire document.

PCT International Search Report and Written Opinion for PCT Application No. PCT/US2021/058730, mailed Feb. 7, 2022 (8 pages).

PCT International Search Report and Written Opinion for PCT Application No. PCT/US2021/058819, mailed Feb. 7, 2022 (9 pages).

PCT International Search Report for Application No. PCT/US2021/058823, mailed Feb. 2, 2022 (8 pages).

PCT International Search Report and Written Opinion for PCT Application No. PCT/US2021/058835, mailed Feb. 4, 2022 (17 pages).

Florent Lallier et al: "Uncertainty assessment in the stratigraphic well correlation of a carbonate ramp: Method and application to the Beausset Basin, SE France", Comptes Rendus Geoscience, Elsevier, Paris, FR, vol. 348, No. 7, Jan. 25, 2016 (Jan. 25, 2016), pp. 499-509, XP029757193.

I. Le Nir et al: "Cross-Section Construction From Automated Well Logcorrelation: A Dynamic Programming Approach Using Multiple Well Logs", SPWLA 39th Annual Logging Symposium, May 1, 1998 (May 1, 1998), XP055327733, Retrieved from the Internet: URL:https://www.onepetro.org/download/conference-paper/SPWLA-1998-DDDid=conferencepaper/SPWLA-1998-DDD[retrieved on Dec. 9, 2016].

Madof Andrew S. et al: "Stratigraphic aliasing and the transient nature of deep-water depositional sequences: Revisiting the Mississippi Fan", GEOLOGY, vol. 47, No. 6, Apr. 16, 2019 (Apr. 16, 2019) pp. 545-549, XP093179240.

* cited by examiner

SUBSURFACE CHARACTERIZATION BASED ON MULTIPLE CORRELATION SCENARIOS

CROSS-REFERENCE TO RELATED APPLICATION

The present application is a national stage application of International Application No. PCT/US2021/058823, filed Nov. 10, 2021, which claims the benefit of U.S. Provisional Application No. 63/113,720, entitled "SUBSURFACE CHARACTERIZATION BASED ON MULTIPLE CORRELATION SCENARIOS," which was filed on Nov. 13, 2020, the entirety of which is hereby incorporated herein by reference.

FIELD

The present disclosure relates generally to the field of characterizing a subsurface region using multiple scenarios of boundary locations within a group of wells.

BACKGROUND

Reservoir characterization from well data is a key challenge in subsurface analysis. Assessing spatial variability of subsurface properties (e.g., reservoir properties) from well data may be difficult, subjective, biased, and non-repeatable. For example, manual correlation of wells may result in limited scenarios or subsurface property values being considered at an undrilled well location. Thus, there is an inability to assess the uncertainty associated with subsurface heterogeneity predictions.

SUMMARY

This disclosure relates to characterizing a subsurface region. Well information, boundary information, and/or other information may be obtained. The well information may define a group of wells within a region of interest. The group of wells may include multiple wells. The boundary information may define scenarios of boundary locations within the group of wells. Individual scenarios of boundary locations within the group of wells may be determined based on propagation of boundaries of a single well in the group of wells to other wells in the group of wells and/or other information. A target interval of a target well may be selected for the group of wells. A top-and-base boundary pair within the target interval may be identified within the individual scenarios of boundary locations. The top-and-base boundary pair may define a package of interest. One or more subsurface properties of the package of interest within the individual scenarios of boundary locations may be determined. One or more subsurface characteristics of the region of interest may be determined based on the subsurface propert(ies) of the package of interest within the individual scenarios of boundary locations and/or other information.

A system that characterizes a subsurface region may include one or more electronic storage, one or more processors and/or other components. The electronic storage may store well information, information relating to wells, information relating to group of wells, boundary information, information relating to scenarios of boundary locations, information relating to propagation of boundaries, information relating to target interval, information relating to target well, information relating to top-and-base boundary pair, information relating to package of interest, information relating to subsurface property, information relating to subsurface characteristic, and/or other information.

The processor(s) may be configured by machine-readable instructions. Executing the machine-readable instructions may cause the processor(s) to facilitate characterizing a subsurface region. The machine-readable instructions may include one or more computer program components. The computer program components may include one or more of a well information component, a boundary information component, a target interval component, a boundary pair component, a subsurface property component, a subsurface characteristic component, and/or other computer program components.

The well information component may be configured to obtain well information and/or other information. The well information may define a group of wells within a region of interest. The group of wells may include multiple wells.

The boundary information component may be configured to obtain boundary information and/or other information. The boundary information may define scenarios of boundary locations within the group of wells. Individual scenarios of boundary locations within the group of wells may be determined based on propagation of boundaries of a single well in the group of wells to other wells in the group of wells and/or other information.

The target interval component may be configured to select a target interval of a target well for the group of wells. In some implementations, the target well may be selected from the group of wells. In some implementations, the target well may be a pseudo well representative of the region of interest. In some implementations, the target interval may be a portion of the target well. In some implementations, the target interval may be entirety of the target well.

The boundary pair component may be configured to identify, within the individual scenarios of boundary locations, one or more top-and-base boundary pairs within the target interval. A top-and-base boundary pair may define a package of interest.

The subsurface property component may be configured to determine one or more subsurface property of the package of interest within the individual scenarios of boundary locations. In some implementations, the subsurface propert(ies) of the package of interest may include thickness, presence, and/or quality of the package of interest.

In some implementations, the determination of the subsurface propert(ies) of the package of interest within the individual scenarios of boundary locations may include spatial mapping of the package of interest for the individual scenarios of boundary locations. In some implementations, the determination of the subsurface propert(ies) of the package of interest within the individual scenarios of boundary locations may include quantification of the subsurface propert(ies) of the package of interest for a corresponding location within the region of interest.

The subsurface characteristic component may be configured to determine one or more subsurface characteristics of the region of interest based on the subsurface property of the package of interest within the individual scenarios of boundary locations and/or other information.

In some implementations, the determination of the subsurface characteristic(s) of the region of interest may include assessment of range or uncertainty of the subsurface propert(ies) of the package of interest within the individual scenarios of boundary locations as a distribution. In some implementations, the determination of the subsurface characteristic(s) of the region of interest may include probability mapping of the subsurface propert(ies) of the package of interest within the individual scenarios of boundary locations.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to characterizing a subsurface region. A group of wells may be located within a region of interest. Multiple scenarios of boundary locations within a group of wells may be obtained. A top-and-base boundary pair, defining a package of interest, may be identified within the individual scenarios of boundary locations. A subsurface property of the package of interest within the individual scenarios of boundary locations may be determined, and the subsurface property of the package of interest within the individual scenarios of boundary locations may be used to determine a subsurface characteristic of the region of interest.

Figure 1:
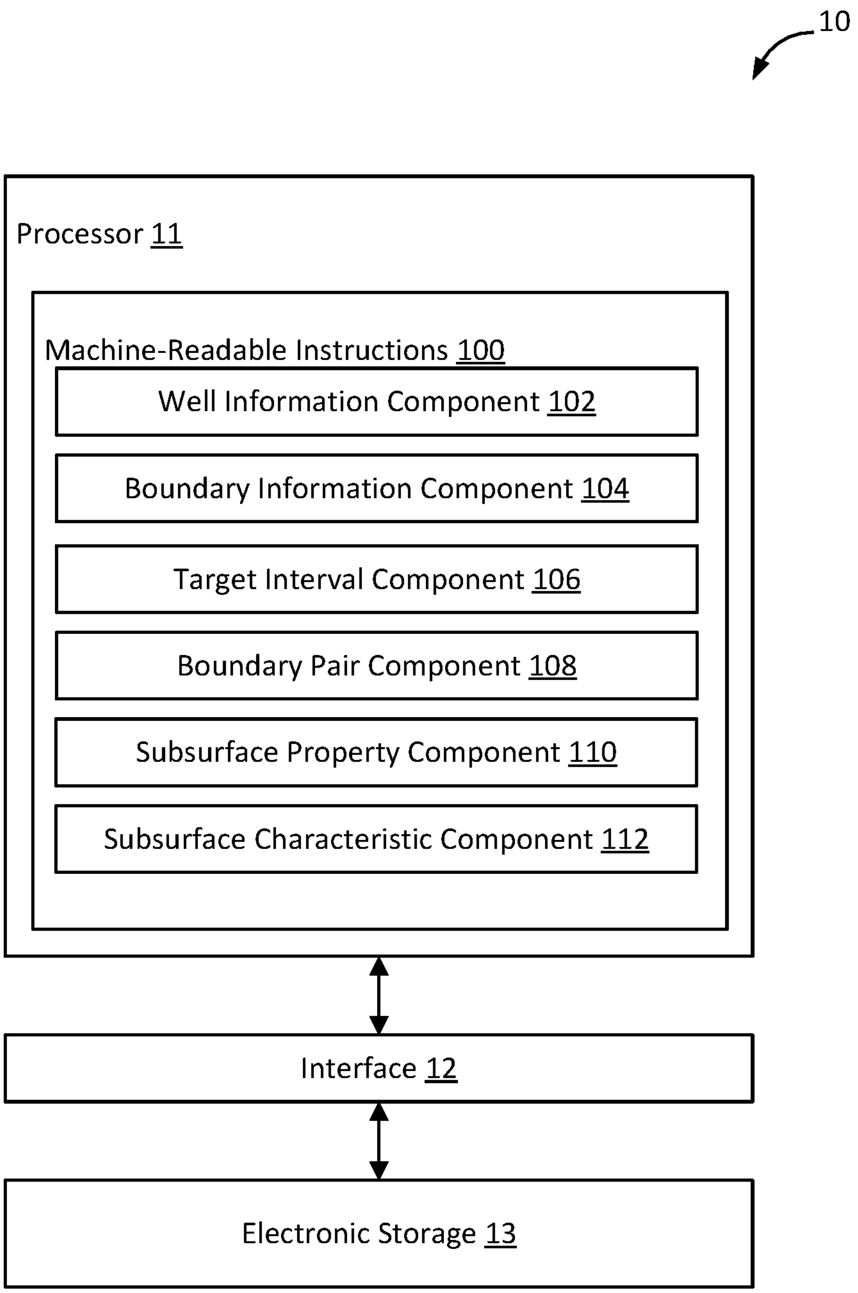
FIG. 1 illustrates an example system that characterizes a subsurface region.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. Well information, boundary information, and/or other information may be obtained by the processor 11. The well information may define a group of wells within a region of interest. The group of wells may include multiple wells. The boundary information may define scenarios of boundary locations within the group of wells. Individual scenarios of boundary locations within the group of wells may be determined based on propagation of boundaries of a single well in the group of wells to other wells in the group of wells and/or other information. A target interval of a target well may be selected for the group of wells by the processor 11. A top-and-base boundary pair within the target interval may be identified within the individual scenarios of boundary locations by the processor 11. The top-and-base boundary pair may define a package of interest. One or more subsurface properties of the package of interest within the individual scenarios of boundary locations may be determined by the processor 11. One or more subsurface characteristics of the region of interest may be determined by the processor 11 based on the subsurface propert(ies) of the package of interest within the individual scenarios of boundary locations and/or other information.

A key step in characterizing a subsurface region (to make decisions such as identifying new drilling locations, determining drilling targets, and designing development strategies) is the stratigraphic correlation of wells (spatial linkage of patterns across wells). Distribution of reservoir properties may be highly complex, varying at multiple rates in three-dimensions, and differently at different vertical scales. As a result, a robust prediction of reservoir properties at an undrilled location, or the hydrocarbon volumes attributed to a given area, may be dependent on how reservoir properties were spatially mapped away from drilled location. The distribution of reservoir properties away from wells may be strongly driven by what patterns a geologist recognizes across wells and decisions on how they correlate, which may be biased by which wells or logs are used.

Conventional stratigraphic correlation may be time consuming and, as a result, a geoscientist may only produce a small number of correlation scenarios, which are single realizations of how patterns in one well correlate to other wells. It may be unfeasible for a geoscientist to effectively produce multiple correlation scenarios based on different single log or combination of logs within a reasonable timeframe. Furthermore, manual evaluation of every combination of patterns, at various scales, that exist across a group of wells, or of conceiving all the possible correlation scenarios may not be possible.

Generating multiple correlation scenarios may be extremely time consuming and inherently biased to the initial patterns that are initially recognized or to the wells/logs from which the correlation process is started. As a result, generating enough correlation scenarios to effectively assess the uncertainty in reservoir presence or reservoir properties at an undrilled location is unfeasible, causing subsurface predictions to be poorly constrained and biased. Additionally, a limiting factor of manual well log interpretation is the inability to fully assess spatial variability reservoir properties from well log data. Manual correlation results in limited scenarios or limited property values being considered at an undrilled well location. As a result, there is an inability to assess the uncertainty associated with subsurface heterogeneity predictions.

The present disclosure enables assessment of the uncertainty of heterogeneity in the subsurface and rapidly generation of data-constrained distributions of key reservoir properties, such as reservoir presence and quality to impact decisions on resource detection and density, drilling locations, and landing zone. The present disclosure utilizes multiple correlation scenarios to constrain/assess the uncertainty, range, or a distribution/histogram in key reservoir properties, such as presence, thickness, or quality.

Referring back to FIG. 1, the electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store well information, information relating to wells, information relating to group of wells, boundary information, information relating to scenarios of boundary locations, information relating to propagation of boundaries, information relating to target interval, information relating to target well, information relating to top-and-base boundary pair, information relating to package of interest, information relating to subsurface property, information relating to subsurface characteristic, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate characterizing a subsurface region. The machine-readable instructions 100 may include one or more computer program components. The machine-readable instructions 100 may include one or more of a well information component 102, a boundary information component 104, a target interval component 106, a boundary pair component 108, a subsurface property component 110, a subsurface characteristic component 112, and/or other computer program components.

The well information component 102 may be configured to obtain well information and/or other information. Obtaining well information may include one or more of accessing, acquiring, analyzing, creating, determining, examining, generating, identifying, loading, locating, opening, receiving, retrieving, reviewing, selecting, storing, utilizing, and/or otherwise obtaining the well information. The well information component 102 may obtain well information from one or more locations. For example, the well information component 102 may obtain well information from a storage location, such as the electronic storage 13, electronic storage of a device accessible via a network, and/or other locations. The well information component 102 may obtain well information from one or more hardware components (e.g., a computing device, a component of a computing device) and/or one or more software components (e.g., software running on a computing device). Well information may be stored within a single file or multiple files.

The well information may define a group of wells within a region of interest. The well information may define a group of wells by defining one or more characteristics of the group of wells. For example, the well information may define subsurface configuration of wells within a group of wells. A region of interest may refer to a region of earth that is of interest. For example, a region of interest may refer to a subsurface region (a part of earth located beneath the surface/located underground) for which subsurface characterization is desired to be performed. A group of wells may include multiple wells. A group of wells may refer to wells that are located within the region of interest. A group of wells may refer to some or all of the wells that are located within the region of interest. In some implementations, a group of wells may include wells that are representative of the region of interest.

Subsurface configuration of a well may refer to attribute, quality, and/or characteristics of the well. Subsurface configuration of a well may refer to type, property, and/or physical arrangement of materials (e.g., subsurface elements) within the well and/or surrounding the well. Examples of subsurface configuration may include types of subsurface materials, characteristics of subsurface materials, compositions of subsurface materials, arrangements/configurations of subsurface materials, physics of subsurface materials, and/or other subsurface configuration. For instance, subsurface configuration may include and/or define types, shapes, and/or properties of materials and/or layers that form subsurface (e.g., geological, petrophysical, geophysical, stratigraphic) structures. In some implementations, subsurface configuration of a well may be defined by values of one or more subsurface properties as a function of position within the well. A subsurface property of a well may refer to a particular attribute, quality, and/or characteristics of the well.

The well information may define a group of wells by including information that describes, delineates, identifies, is associated with, quantifies, reflects, sets forth, and/or otherwise defines one or more of content, quality, attribute, feature, and/or other aspects of the group of wells. For example, the well information may define a well by including information that makes up the content of the well and/or information that is used to identify/determine the content of the wells.

In some implementations, the well information may include one or more well logs and/or associated information for the individual wells in the group of wells. The well information may include a single well log or a suite of well logs for individual wells in the group of wells. For instance, the well information may include one or more well logs (of natural well, of virtual well), information determined/extracted from one or more well logs (e.g., of natural well, or virtual well), information determined/extracted from one or more well cores (e.g., of natural well, or virtual well), and/or other information. The well logs may be related to reservoir properties, such as reservoir quality or presence. For example, the well information may include one or more well logs relating to one or more properties of a well/the subsurface location, such as rock types, layers, grain sizes, porosity, and/or permeability of the well at different positions within the well. Other types of well information are contemplated.

The boundary information component 104 may be configured to obtain boundary information and/or other information. Obtaining boundary information may include one or more of accessing, acquiring, analyzing, creating, determining, examining, generating, identifying, loading, locating, opening, receiving, retrieving, reviewing, selecting, storing, utilizing, and/or otherwise obtaining the boundary information. The boundary information component 104 may obtain boundary information from one or more locations. For example, the boundary information component 104 may obtain boundary information from a storage location, such as the electronic storage 13, electronic storage of a device accessible via a network, and/or other locations. The boundary information component 104 may obtain boundary information from one or more hardware components (e.g., a computing device, a component of a computing device) and/or one or more software components (e.g., software running on a computing device). Boundary information may be stored within a single file or multiple files.

The boundary information may define scenarios of boundary locations within the group of wells. The boundary information may define scenarios of boundary locations within the group of wells by defining one or more characteristics of the scenarios of boundary locations within the group of wells. The boundary information may define a scenario of boundary locations within a well by including information that describes, delineates, identifies, is associated with, quantifies, reflects, sets forth, and/or otherwise defines one or more of property, quality, attribute, feature, and/or other aspects of the scenario of boundary locations within the well. For example, the boundary information may define a scenario of boundary locations within a well by including information that specifies number and/or locations of boundaries within the well within the scenario of boundary location and/or information that is used to determine number and/or locations of boundaries within the well within the scenario of boundary location. Other types of boundaries information are contemplated.

A boundary within a well may refer to a feature and/or a place (e.g., in time, space) within the well that separate two distinct segments/packages of the well. A boundary location may refer to location of the boundary within the well. Boundary locations may be defined in terms of geologic space and/or geologic time. A scenario of boundary locations within a well refer to a set of potential locations of boundaries within the well. A scenario of boundary locations within a well may be determined based on the subsurface configuration of the well, the subsurface configuration of one or more other wells in the group of wells, and/or other wells. A scenario of boundary locations within a well refer to and/or may be determined from a correlation scenario between the wells.

For example, individual scenarios of boundary locations within the group of wells may be determined based on propagation of boundaries of a single well in the group of wells to other wells in the group of wells and/or other information. A single scenario of boundary locations within the group of wells may be determined based on propagation of boundaries of one well in the group of wells to other wells in the group of wells. The well in the group from which the boundaries are propagated to other wells may be referred to as a source well. A single scenario of boundary locations within the group of wells may be determined by identifying boundary locations within the source well, and propagating the boundary locations within the source well to the other wells. The identification and propagation of the boundary locations from the source well to the other wells may be repeated for different wells within the group of wells. For example, each well in the group of wells may be a source well for separate determination of scenarios of boundary locations within the group of wells.

In some implementations, scenarios of boundary locations within the group of wells may be determined based on alignment of wells in the group of wells. Determination of a scenario of boundary locations within the group of wells may include: (1) identification of boundaries within the source well, (2) generation of branching well paths connecting the group of wells through the source well, where the origin of the branching well paths is located at the source well, (3) identification of a shortest path between the source well and the group of wells along the branching well paths, (4) alignment of the group of wells along the shortest path in a global "Relative Geologic Time" (RGT) solution, and (5) propagation of the boundaries of the source well to the aligned group of wells such that the boundaries of the source well are pushed/copied to the wells aligned in the RGT space. Propagation of the boundaries of the source well to the wells aligned in the RGT space may establish correlation between the source well to the wells. The boundary locations within the wells may be converted from the RGT space to true depth (e.g., in real space/in time). In some implementations, scenarios of boundary locations within the group of wells may be determined based on propagation of the boundary locations from a well to the group of wells as described in PCT Application No. PCT/US21/58730, entitled "WELL CORRELATION THROUGH INTERMEDIARY WELL," which was filed on Nov. 10, 2021, the entirety of which is hereby incorporated herein by reference.

In some implementations, separate scenarios of boundary locations within the group of wells may be determined based variations of the following: (1) the types of well information used in correlating wells (e.g., different types of single logs, different combinations of multiple logs); (2) identification of boundaries within the source well (e.g., number of boundaries identified within the source well, techniques used to identify boundaries within the source well, parameters of techniques used to identify boundaries within the source well, such as Continuous Wavelet Transform scale); (3) types of wells used as source well (e.g., real well, pseudo well), (4) wedging tolerance. Other variations to generate separate scenarios of boundary locations within the group of wells are contemplated.

The target interval component 106 may be configured to select a target interval of a target well for the group of wells. A target well may refer to a well at which variability of boundary locations across different scenarios of boundary locations are assessed. A target well may refer to a well within which variability of characteristics/properties across different scenarios of boundary locations are assessed. A target well may refer to a well within which packages of interest are to be identified. In some implementations, the target well may be selected from the group of wells. That is, one of the wells within the group of wells may be selected as the target well. In some implementations, the target well may be a pseudo well representative of the region of interest (e.g., type well). The pseudo well may be generated based on combination of subsurface configuration of multiple wells within the group of wells. Different wells may be selected as the target well to assess boundary locations/characteristics/property in different locations within the region of interest. The assessment of target well may be repeated for different wells within the group of wells.

A target interval may refer to an interval of a well within which variability of boundary locations across different scenarios of boundary locations are assessed. A target interval may refer to an interval of a well within which variability of characteristics/properties across different scenarios of boundary locations are assessed. A target interval may refer to an interval of a well within which packages of interest are to be identified. For example, a target interval may include a vertical zone (in time, in space) in a well. In some implementations, the target interval may be manually selected (e.g., by a user). In some implementations, the target interval may be automatically selected (e.g., based on default, depth or RGT relative to a regionally mapped or pre-existing boundaries, within a relative depth based on a key recognizable pattern, multiple moving windows based on multiple scales). In some implementations, the target interval may be predetermined, such as based on other analysis. In some implementations, the target interval may be a portion of the target well. That is, smaller than the entirety of the target well may be used as the target interval.

In some implementations, the target interval may be entirety of the target well. Using the entire length of the target well (rather than a portion) may result in assessment using full combination of all boundary locations. Such assessment may include iteration over different combinations/every combination of any two boundaries in a single scenario of boundary locations.

Figure 3:
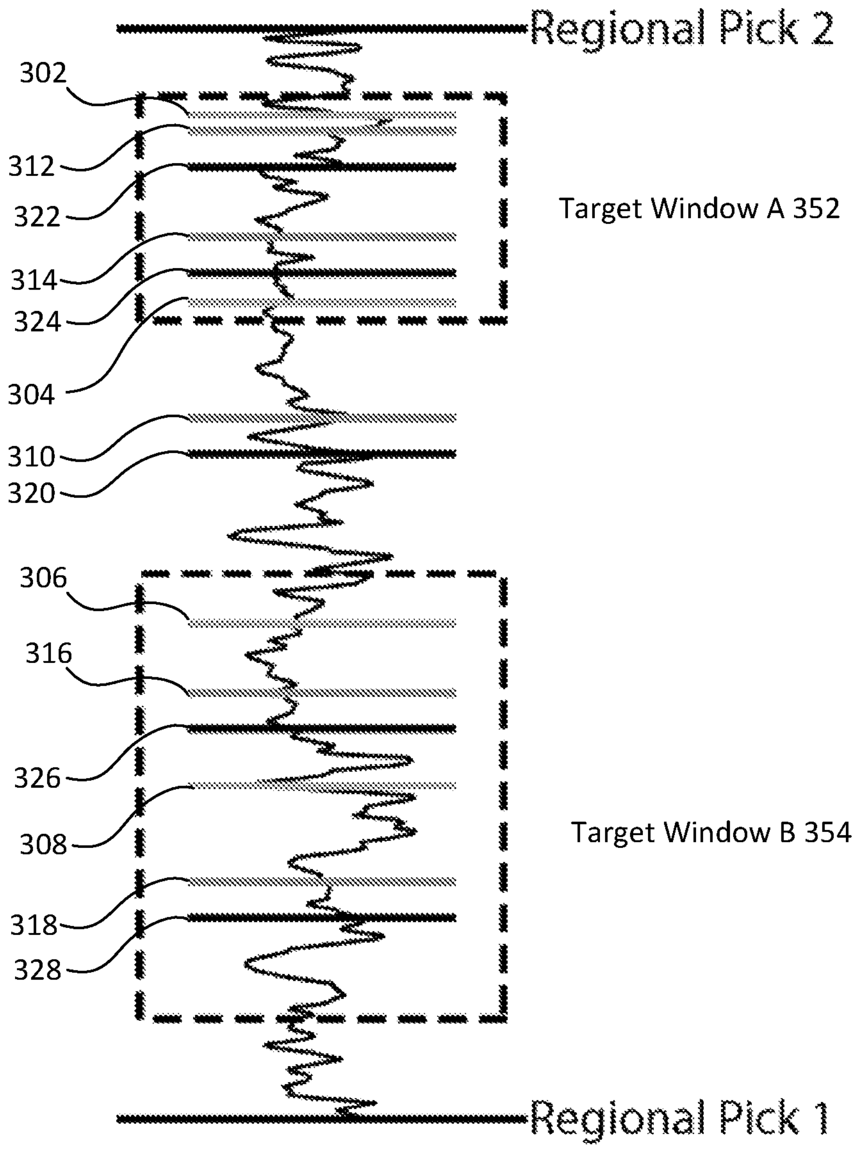
FIG. 3 illustrates example boundary locations within a well from multiple correlation scenarios.

FIG. 3 illustrates example boundary locations within a well from multiple scenarios of boundary locations. FIG. 3 may include a curve that visually depicts subsurface configuration along the length of the well. Separate scenarios of boundary locations within the well may provide separate boundary locations within the well. For example, FIG. 3 may include boundaries from three scenarios of boundary locations (e.g., three correlation scenarios). Boundary 302, 304, 306, 308 may be from one scenario, boundary 310, 312, 314, 316, 318 may be from another scenario, and boundary 320, 322, 324, 326, 328 may be from yet another scenario. Different scenarios may place the boundaries at different locations within the well. Different scenarios may place the boundaries at different locations relative to a single or series of target intervals.

FIG. 3 may include two target windows: a target window A 352, and a target window B 354. The boundaries 302, 304, 312, 314, 322, 324 may be within the target window A 352. The boundaries 306, 308, 316, 318, 326, 328 may be within the target window B 354. The boundaries 310, 320 may not be within either of the target windows 352, 354.

The boundary pair component 108 may be configured to identify, within the individual scenarios of boundary locations, one or more top-and-base boundary pairs within the target interval. A top-and-base boundary pair may include a top boundary and a bottom boundary. A top boundary may refer to a top pick of a package, and a bottom boundary may refer to a bottom pick of the package. A top-and-base boundary pair may define a package of interest within the target interval or within a certain distance of a target window. A package of interest may refer to a package of earth that is of interest. For example, a package of interest may refer to a package of rock to be characterized. The top boundary may define the top end of the package within the well and the bottom boundary may define the bottom end of the package within the well (for the corresponding scenario). The boundary pair component 108 may be configured to determine whether a top boundary and a bottom boundary are present within the target window for a scenario of boundary locations. Boundaries that are not in pairs may be removed/dropped from the assessment.

For example, referring to FIG. 3, three top-and-base boundary pairs may be identified within the target window A 352, and three top-and-base boundary pairs may be identified within the target window B 354. Three top-and-base boundary pairs within the target window A 352 may include: (1) pair of the boundaries 302, 304, (2) pair of the boundaries 312, 314, and (3) pair of the boundaries, 322, 324. Three top-and-base boundary pairs within the target window B 354 may include: (1) pair of the boundaries 306, 308, (2) pair of the boundaries 316, 318, and (3) pair of the boundaries, 326, 328. While FIG. 3 shows individual scenarios placing two boundaries within individual target windows, this is merely as an example and is not meant to be limiting. In some implementations, one or more scenarios of boundary locations may place other number of boundaries within individual target windows.

The subsurface property component 110 may be configured to determine one or more subsurface properties of the package of interest within the individual scenarios of boundary locations. A subsurface property of a package may refer to a particular attribute, quality, and/or characteristics of the package. A subsurface property of a package of interest may refer to a subsurface property that is of interest in characterizing the package of interest/the subsurface region. For example, a subsurface property of a package of interest may include thickness, presence, and/or quality of the package of interest. For instance, a package of interest may include a reservoir, and the subsurface property of a package of interest may include thickness, presence, and/or quality of the reservoir. Other packages of interest and other subsurface properties are contemplated.

The subsurface property component 110 may spatially map out, for individual scenarios of boundary locations, the boundaries/boundary locations and/or the package on interest (defined by the boundaries) throughout the region of interest to determine the subsurface propert(ies) of the package of interest. The subsurface propert(ies) of the package of interest may be separately calculated for separate scenarios of boundary locations based on location of the package within the region of interest.

The subsurface property component 110 may quantify, for individual scenarios of boundary locations, the subsurface propert(ies) of the package of interest for corresponding locations within the region of interest. A subsurface property of a package of interest may be determined as numerical values, categorial values (e.g., classes), and/or other values. For example, a subsurface property of a package of interest may be determined as/based on average of subsurface properties within the package of interest. The depth (e.g., in time, space) of the corresponding locations within the religion of interest may be stored/associated with the subsurface propert(ies) of the package of interest. Other quantification of the subsurface propert(ies) of the package of interest is contemplated.

Figure 4:
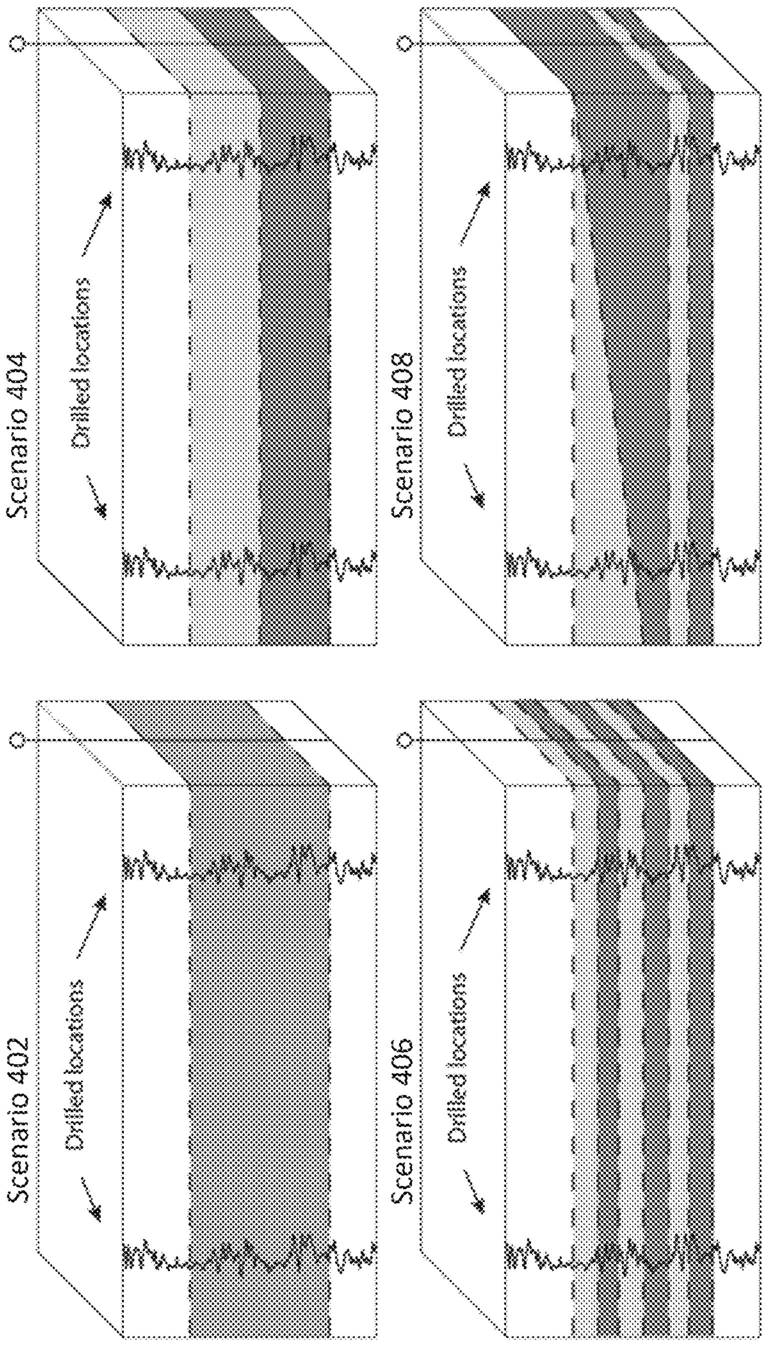
FIG. 4 illustrates multiple scenarios of packages within a subsurface region.

FIG. 4 illustrates multiple scenarios of packages within a subsurface region. Based on different scenarios boundary locations, different scenarios of packages may be generated. In scenario 402, a single package may be identified between two wells. In scenario 404, two packages may be identified between two wells. In scenario 406, six packages may be identified between two wells. In scenario 408, four packages may be identified between two wells, with the size of two packages changing between the two wells. The values of the subsurface propert(ies) throughout the packages may be used to calculate the overall subsurface propert(ies) of the packages. For example, average values of a subsurface property between the boundaries may be used to calculate the overall value of the subsurface property for the packages. Different overall values of the subsurface property for the same package across different scenarios may be used to determine a histogram/frequency distribution of the subsurface property. For example, different presence, thickness, and/or quality of a reservoir across different scenarios may be used to determine a histogram/frequency distribution of the presence, thickness, and/or quality of the reservoir within the region of interest.

The subsurface characteristic component 112 may be configured to determine one or more subsurface characteristics of the region of interest. A subsurface characteristic of the region of interest may refer to a feature, a quality, and/or a property of the region of interest. A subsurface characteristic of the region of interest may characterize/describe the region of interest. The subsurface characteristic(s) of the region of interest may be determined based on the subsurface propert(ies) of the package of interest within the individual scenarios of boundary locations and/or other information. The subsurface propert(ies) of the package of interest assessed from different scenarios of boundary locations may be used to determine the subsurface characteristic(s) of the region of interest.

In some implementations, the determination of the subsurface characteristic(s) of the region of interest may include assessment of the range of uncertainty of the subsurface propert(ies) of the package of interest within the individual scenarios of boundary locations. The range of uncertainty of the subsurface propert(ies) of the package of interest may be assessed across multiple scenarios. The range of uncertainty of the subsurface propert(ies) may be assessed as a distribution, such as a histogram and/or a frequency distribution. In some implementations, the determination of the subsurface characteristic(s) of the region of interest may include spatial mapping of the subsurface propert(ies) of the package of interest and comparison based on depths or distance from key regional features (e.g., surfaces). Determination of the subsurface characteristic(s) of the region of interest from multiple scenarios of boundary locations (e.g., multiple correlation scenarios) may provide probabilistic understanding of the package of interest. This information may be used to facilitate ranking and/or determining optimal drilling locations.

In some implementations, the determination of the subsurface characteristic(s) of the region of interest may include probability mapping of the subsurface propert(ies) of the package of interest within the individual scenarios of boundary locations. For example, the subsurface propert(ies) may be mapped/interpolated and used as a three-dimensional probability cube with values representing variance or an average value at depth (e.g., based on multiple approaches such as windows, nearest neighbor, most likely value within a window).

Figure 5:
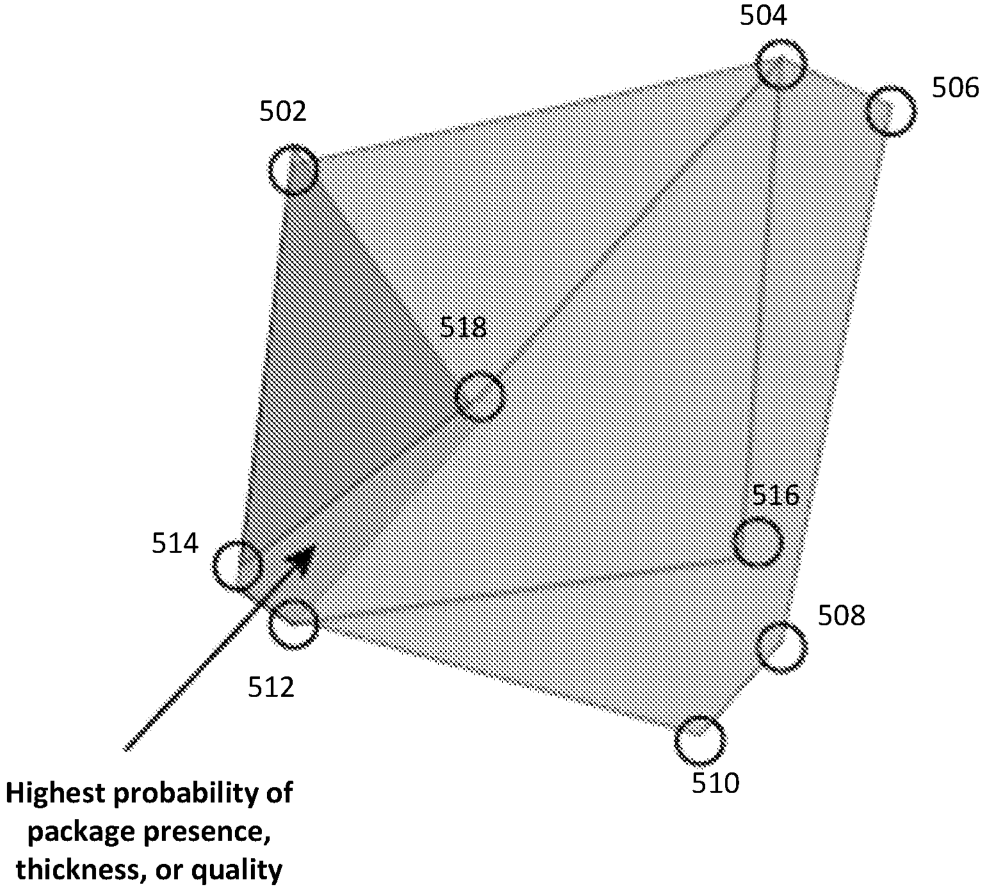
FIG. 5 illustrates example mapping of a package characteristic from multiple correlation scenarios.

FIG. 5 illustrates example mapping of an extent of a package characteristic from multiple correlation scenarios for wells 502, 504, 506, 508, 510, 512, 514, 516, 518. Three scenarios of packages between the wells 502, 504, 506, 508, 510, 512, 514, 516, 518 may be determined from three scenarios of boundary locations/correlation scenarios. The package characteristic mapped in FIG. 5 may include presence, thickness, and/or quality, and/or package characteristics. For example, different extent of a reservoir may be determined within the three scenarios. In a first scenario, the reservoir may extend within an area defined by the wells 502, 504, 506, 508, 510, 512, 514. In a second scenario, the reservoir may extend within an area defined by the wells 502, 512, 514, 518. In a third scenario, the reservoir may extend within an area defined by the wells 512, 514, 516, 518. The degree/amount of overlap between the extent of the reservoir in different scenarios may be used to weigh the probability of certainty in reservoir presence, thickness, quality, and/or other reservoir property. For example, an area to which the reservoir extends in all three scenarios (defined by the wells 512, 514, 518) may be weighed to have the highest probability of the reservoir presence, thickness, and/or quality.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
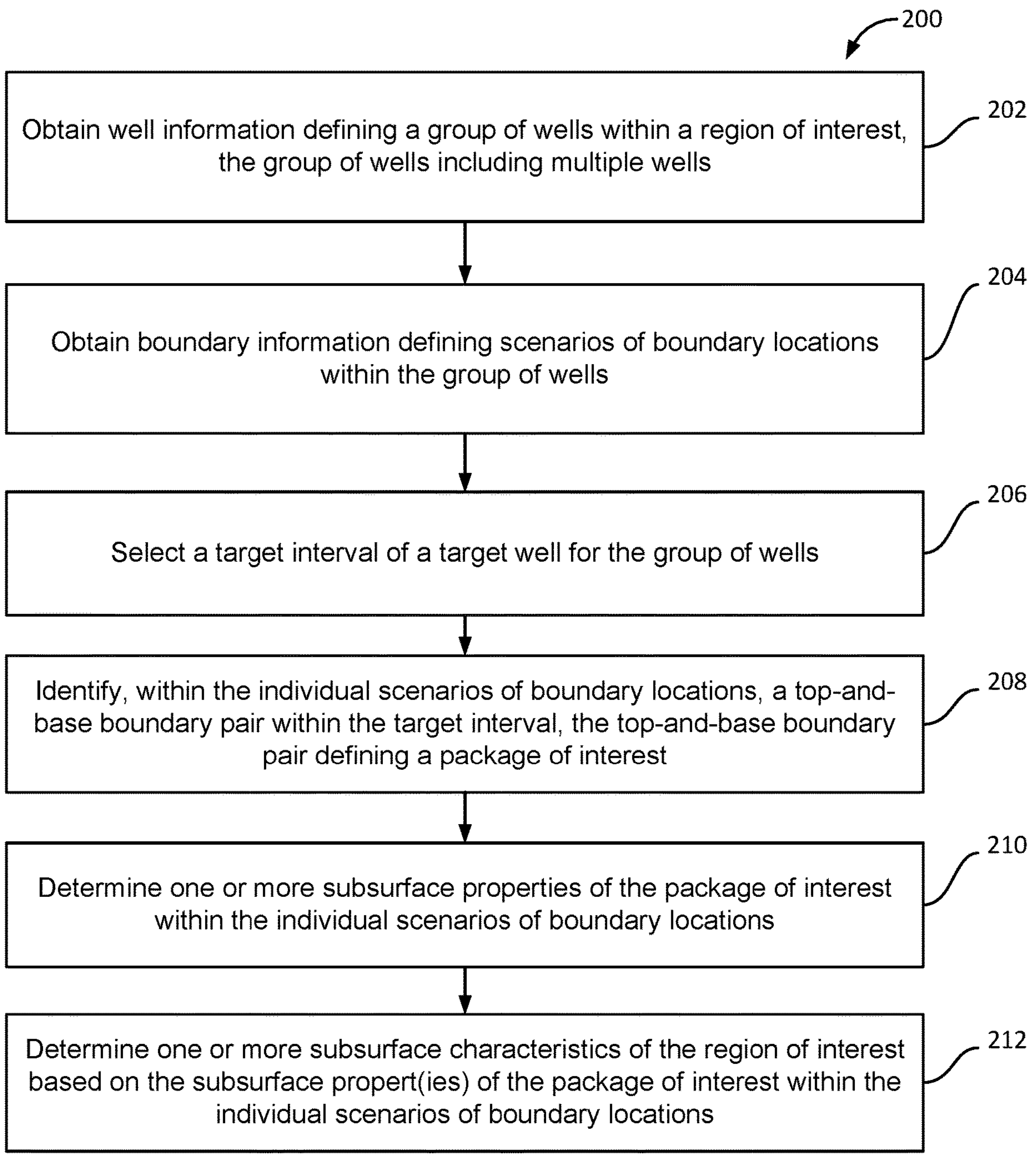
FIG. 2 illustrates an example method for characterizing a subsurface region.

FIG. 2 illustrates method 200 for characterizing a subsurface region. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, well information and/or other information may be obtained. The well information may define a group of wells within a region of interest. The group of wells may include multiple wells. In some implementation, operation 202 may be performed by a processor component the same as or similar to the well information component 102 (Shown in FIG. 1 and described herein).

At operation 204, boundary information and/or other information may be obtained. The boundary information may define scenarios of boundary locations within the group of wells. Individual scenarios of boundary locations within the group of wells may be determined based on propagation of boundaries of a single well in the group of wells to other wells in the group of wells. In some implementation, operation 204 may be performed by a processor component the same as or similar to the boundary information component 104 (Shown in FIG. 1 and described herein).

At operation 206, a target interval of a target well may be selected for the group of wells. In some implementation, operation 206 may be performed by a processor component the same as or similar to the target interval component 106 (Shown in FIG. 1 and described herein).

At operation 208, a top-and-base boundary pair within the target interval may be identified within the individual scenarios of boundary locations. The top-and-base boundary pair may define a package of interest. In some implementation, operation 208 may be performed by a processor component the same as or similar to the boundary pair component 108 (Shown in FIG. 1 and described herein).

At operation 210, one or more subsurface properties of the package of interest within the individual scenarios of boundary locations may be determined. In some implementation, operation 210 may be performed by a processor component the same as or similar to the subsurface property component 110 (Shown in FIG. 1 and described herein).

At operation 212, one or more subsurface characteristics of the region of interest may be determined based on the subsurface propert(ies) of the package of interest within the individual scenarios of boundary locations and/or other information. In some implementation, operation 212 may be performed by a processor component the same as or similar to the subsurface characteristic component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for characterizing a subsurface region, the system comprising:

one or more physical processors configured by machine-readable instructions to:

obtain well information, the well information defining a group of wells within a region of interest, the group of wells including multiple wells;

obtain boundary information, the boundary information defining scenarios of boundary locations within the group of wells, the scenarios of boundary locations including a first scenario of boundary locations and a second scenario of boundary locations, wherein the first scenario of boundary locations and the second scenario of boundary locations include different numbers or different placements of boundaries within a target well for the group of wells, individual scenarios of boundary locations within the group of wells determined based on propagation of boundaries of a single well in the group of wells to other wells in the group of wells;

select a target interval of the target well for the group of wells, the target interval of the target well including an interval of the target well with variability of boundary locations across different scenarios of boundary locations, wherein the first scenario of boundary locations and the second scenario of boundary locations include different numbers or different placements of boundaries within the target interval of the target well;

identify, within the individual scenarios of boundary locations, a top-and-base boundary pair within the target interval, the top-and-base boundary pair including a top boundary and a bottom boundary, the top-and-base boundary pair defining a package of interest, wherein a first top-and-base boundary pair is identified within the target interval within the first scenario of boundary locations and a second top-and-base boundary pair is identified within the target interval within the second scenario of boundary locations, the first top-and-base boundary pair different from the second top-and-base boundary pair, the first top-and-base boundary pair defining a first package of interest within the first scenario of boundary locations and the second top-and-base boundary pair defining a second package of interest within the second scenario of boundary locations, the first package of interest different from the second package of interest for the target interval;

determine thickness, presence, or quality of a reservoir in the package of interest within the individual scenarios of boundary locations, wherein first thickness, presence, or quality of the reservoir is determined within the first scenario of boundary locations and second thickness, presence, or quality of the reservoir is determined within the second scenario of boundary locations;

determine the thickness, presence, or quality of the reservoir in the region of interest based on the thickness, presence, or quality of the reservoir in the package of interest within the individual scenarios of boundary locations, wherein use of the different packages of interest for the target interval from different scenarios of boundary locations provides uncertainty assessment of the reservoir associated with subsurface heterogeneity predictions; and determine a drilling target for an undrilled location in the region of interest based on the thickness, presence, or quality of the reservoir in the region of interest, wherein the undrilled location in the region of interest is drilled using the drilling target.

2. The system of claim 1, wherein the target well is selected from the group of wells.

3. The system of claim 1, wherein the target well is a pseudo well representative of the region of interest.

4. The system of claim 1, wherein the target interval is a portion of the target well.

5. The system of claim 1, wherein the target interval is entirety of the target well.

6. The system of claim 1, wherein the package of interest for the individual scenarios of boundary locations is spatially mapped to the region of interest.

7. The system of claim 6, wherein a degree or an amount of overlap between the different packages of interest across the different scenarios of boundary locations determines weighting of uncertainty in the thickness, presence, or quality of the reservoir.

8. The system of claim 7, wherein the spatial mapping of the package of interest within the individual scenarios of boundary locations includes probability mapping of the thickness, presence, or quality of the reservoir.

9. The system of claim 1, wherein the thickness, presence, or quality of the reservoir across the different scenarios of boundary locations are determined as a distribution.

10. The system of claim 1, wherein the one or more physical processors are further configured by the machine-readable instructions to identify new drilling locations for wells based on the thickness, presence, or quality of the reservoir in the region of interest.

11. A method for characterizing a subsurface region, the method comprising:

obtaining well information, the well information defining a group of wells within a region of interest, the group of wells including multiple wells;

obtaining boundary information, the boundary information defining scenarios of boundary locations within the group of wells, the scenarios of boundary locations including a first scenario of boundary locations and a second scenario of boundary locations, wherein the first scenario of boundary locations and the second scenario of boundary locations include different numbers or different placements of boundaries within a target well for the group of wells, individual scenarios of boundary locations within the group of wells determined based on propagation of boundaries of a single well in the group of wells to other wells in the group of wells;

selecting a target interval of the target well for the group of wells, the target interval of the target well including an interval of the target well with variability of boundary locations across different scenarios of boundary locations, wherein the first scenario of boundary locations and the second scenario of boundary locations include different numbers or different placements of boundaries within the target interval of the target well;

identifying, within the individual scenarios of boundary locations, a top-and-base boundary pair within the target interval, the top-and-base boundary pair including a top boundary and a bottom boundary, the top-and-base boundary pair defining a package of interest, wherein a first top-and-base boundary pair is identified within the target interval within the first scenario of boundary locations and a second top-and-base boundary pair is identified within the target interval within the second scenario of boundary locations, the first top-and-base boundary pair different from the second top-and-base boundary pair, the first top-and-base boundary pair defining a first package of interest within the first scenario of boundary locations and the second top-and-base boundary pair defining a second package of interest within the second scenario of boundary locations, the first package of interest different from the second package of interest for the target interval;

determining thickness, presence, or quality of a reservoir in the package of interest within the individual scenarios of boundary locations, wherein first thickness, presence, or quality of the reservoir is determined within the first scenario of boundary locations and second thickness, presence, or quality of the reservoir is determined within the second scenario of boundary locations;

determining the thickness, presence, or quality of the reservoir in the region of interest based on the thickness, presence, or quality of the reservoir in the package of interest within the individual scenarios of boundary locations, wherein use of the different packages of interest for the target interval from different scenarios of boundary locations provides uncertainty assessment of the reservoir associated with subsurface heterogeneity predictions; and determining a drilling target for an undrilled location in the region of interest based on the thickness, presence, or quality of the reservoir in the region of interest, wherein the undrilled location in the region of interest is drilled using the drilling target.

12. The method of claim 11, wherein the target well is selected from the group of wells.

13. The method of claim 11, wherein the target well is a pseudo well representative of the region of interest.

14. The method of claim 11, wherein the target interval is a portion of the target well.

15. The method of claim 11, wherein the target interval is entirety of the target well.

16. The method of claim 11, wherein the package of interest for the individual scenarios of boundary locations is spatially mapped to the region of interest.

17. The method of claim 16, wherein a degree or an amount of overlap between the different packages of interest across the different scenarios of boundary locations determines weighting of uncertainty in the thickness, presence, or quality of the reservoir.

18. The method of claim 17, wherein the spatial mapping of the package of interest within the individual scenarios of boundary locations includes probability mapping of the thickness, presence, or quality of the reservoir.

19. The method of claim 11, wherein the thickness, presence, or quality of the reservoir across the different scenarios of boundary locations are determined as a distribution.

20. The method of claim 11, further comprising identifying new drilling locations for wells based on the thickness, presence, or quality of the reservoir in the region of interest.

* * * * *